Patented Oct. 25, 1949

2,485,625

UNITED STATES PATENT OFFICE 2,485,625

POLYISOBUTYLENE-ASPHALT COMPOSITION CONTAINING HARDENING AGENT

Robert W. Merley and Victor A. Navikas, Lancaster, Pa., assignors to Armstrong Cork Company, Lancaster, Pa., a corporation of Pennsylvania No Drawing. Application March 10, 1944,
Serial No. 525,944

6 Claims. (Cl. 260—4)

This application is a continuation-in-part of our co-pending patent application, Serial No. 430,968, filed February 14, 1942, now abandoned.

This invention relates to compositions of matter and more particularly to a composition of matter which is particularly suitable for use as a liner for container closures; and it comprises a composition including polyisobutylene, asphalt containing a hardening agent for the polyisobutylene, and a filler; the invention further comprises a method of preparing the composition in which the asphalt and hardening agent are blended by heating, an intimate mixture of the hardening agent and asphalt is formed by agitating the mixture, the mixture of asphalt and hardening agent is added to the polyisobutylene, the filler is then added, and the resulting mixture is then heated and agitated until a homogeneous mixture is obtained; all as more fully hereinafter set forth and as claimed.

A suitable liner is a necessity in almost all types of container closures. These liners must be of such a nature as to withstand successfully a wide variety of conditions. For example, a liner must be flexible and compressible so that a tight seal is formed between the closure itself and the lip of the container. Further, the liner must be impervious to liquids and gases so that the contents of the container cannot pass through the liner and attack the closure, and the material which is employed as a liner should be substantially odorless and tasteless so that no detrimental effects result from the use of the material as a liner for closures for foods and beverages.

The most widely used lining material has been cork or cork composition. These liners possess many of the characteristics required of a lining material, and because of their heretofore availability in large quantities enabled manufacturers to employ them at relatively small cost. However, cork or cork composition must be stored under carefully controlled conditions to prevent development of mold thereon which mold prevents their use as closure lining material. Further, these particular cork or cork composition liners, in addition to being somewhat permeable, are no longer available in as large quantities as was heretofore the case, and, therefore, the manufacturers are faced with a very serious problem in the liner field.

Certain compositions have been proposed heretofore as materials suitable for use in container closures as liners. However, the majority of these compositions are unsuitable in one respect or another. For example, many of them such as rubber, and rubber composition possess an odor and taste and tend to oxidize over a period of time so that the sealing properties are undesirably reduced. Synthetic rubbers exhibit an odor and taste, and other compositions which have been proposed such as faced pulpboard are not sufficiently flexible or compressible to form a tight seal between the container lip and the closure. Therefore, such liners are unsuitable for use with closures which are to be employed in capping pressure foods and beverages.

Within the past few years there has been developed a polymer of isobutylene which is prepared by polymerizing isobutylene in the presence of a Friedel-Crafts catalyst such as aluminum chloride, boron trifluoride and the like at temperatures of from 0° F. to —100° F. or lower. Polyisobutylene has been modified with various materials and has been employed in quite a wide variety of uses. For example, as disclosed in U. S. Patent 2,133,412 to Anderson, polyisobutylene has been modified with mineral oil and paraffin wax to produce a petrolatum-like product; a polyisobutylene coumarone-indene resin composition is disclosed in the U. S. patent to Carmody 2,241,340, but this composition is too tacky for use in closures as a lining material; chlorinated naphthalene and polyisobutylene is disclosed in U. S. patent to Engelhardt et al. 2,248,749, but this composition is adhesive in nature and is toxic; and Anderson et al. disclose in U. S. Patent 2,197,461 polyisobutylene and asphalt compositions, but the compositions contain an excess of asphalt and are unsuitable for use as closure lining materials because of their tackiness. Thus, the polyisobutylene compositions of the prior art are unsuitable as closure lining material because of the fact that they are either too soft, too brittle, or too tacky.

Attempts have been made to harden polyisobutylene compositions by using various hardening agents such as polystyrene, phenol aldehyde resins and the like, but the resulting compositions still exhibit such a degree of tackiness and incompatibility as to be unsuitable for use as closure lining materials.

We have found a composition which exhibits remarkable properties which make it particularly adaptable for use as a closure lining material. Broadly, our invention comprises a composition which includes polyisobutylene, asphalt, a hardening agent for the polyisobutylene, and a filler.

This particular composition is sufficiently free of tack so that the material does not adhere to the lip of the container even upon prolonged contact therewith, and there is no tendency of the material to pick up dirt or other impurities during the assembly of the closure. Furthermore, the material is sufficiently flexible and compressible to allow its use as a liner for closure for pressure foods and beverages, without danger of loss of gas from the container contents. In addition, the composition is relatively free from cold flow properties so that excellent sealing is obtained.

The composition of our invention is prepared by incorporating the hardening agent into the asphalt by heating to a temperature of about the melting point of the particular hardening agent used and agitating the mixture in a suitable device. The hardening agent and asphalt blend is then added to the polyisobutylene and heated at an elevated temperature until a homogeneous mixture is obtained. The filler is then added and the mixture is subjected to further heat and agitation. This order of mixing is necessary in order to obtain a tack-free composition.

Although various types of asphalt may be employed in the preparation of our composition, we have found that most advantageous results are obtained when a blown asphalt having a melting point of about 220° F. to about 230° F. is utilized. The use of this particular asphalt results in a final composition which is exceedingly satisfactory both from the standpoint of carbonation retention and freedom from tack, odor, and taste. The function of the asphalt in our composition is to allow modification of the polyisobutylene with the hardening agent and the filler and yet result in a composition which is compatible and nontacky. Although asphalt is tacky, polyisobutylene is tacky and the modified polyisobutylene compositions of the prior art are tacky, we have found, surprisingly, that a composition comprising polyisobutylene asphalt and a hardening agent may be prepared which is nontacky and may be employed as a lining material. It appears that the asphalt, being compatible with both the polyisobutylene and the hardening agent, increases the compatibility of the hardening agent and polyisobutylene to such a degree that a tack-free composition is obtained. However, we do not intend to limit our invention to any particular theory of operation.

The hardening agent which may be employed according to our invention may be selected from a wide number of materials, for example, a rubber resin such as rubber hydrochloride or rubber chloride or non-reactive phenolic resins, polystyrene, polycoumarone, polyindene, high melting point waxes, limed rosin, ester gum, and the like, or mixtures of these materials may be used. We have obtained particularly advantageous results when using one or more of the following resins as the hardening agent: rubber hydrochloride, rubber chloride, polystyrene, polycoumarone, polyindene, and a non-reactive, terpene-modified phenol-carbonyl resin. Excellent results have been obtained with a hardening agent comprising polystyrene and a phenol-carbonyl resin and also with a hardening agent comprising a rubber resin such as rubber hydrochloride or rubber chloride, polystyrene, and a phenol-carbonyl resin. The preferred phenolic resins are non-reactive, terpene-modified phenol-carbonyl resins, for example, a condensation product of a terpene, a phenol, and formaldehyde; a condensation product of a terpene, a phenol, and acetone; and the like.

As the filling material of our composition, we may employ mineral fillers such as talc, clay, vermiculite, asbestine, calcium silicate, magnesium silicate, and the like or vegetable fillers such as flax fiber, wood flour, walnut shell flour, fir bark, ground peanut shells, leather fiber, jute fiber, pine needle fiber, ground cocoanut shells, and the like.

We prefer to employ medium molecular weight polyisobutylene in the preparation of our composition. Such polymers have an average molecular weight of about 100,000 to about 150,000.

Although our composition may vary as to the proportions of the individual ingredients thereof, we have obtained particularly advantageous results in closure lining materials comprising about 20 to 30 parts by weight of polyisobutylene, about 13 to 30 parts by weight of asphalt, about 8 to 16 parts by weight of hardening agent, and filler. For these quantities, we prefer to employ about 25 to 55 parts by weight of filler though larger or smaller amounts of filler may be used. If the amount of filler is greatly reduced, the cost of the material is unduly increased and there may be a tendency for the material to flow and if the amount of filler is greatly increased, the product may not have the desired resiliency though the quantity of filler which should be used will be readily apparent to one skilled in the art. When we employ a mixture of hardening agent as outlined above, we prefer to employ about one part by weight of a hardening agent such as polystyrene, polyindene, polycoumarone, and the like to two parts by weight of phenolic resin such as a condensation product of a terpene, a phenol, and formaldehyde or a condensation product of a terpene, a phenol, and acetone. When we employ a mixture of rubber hydrochloride or rubber chloride, polystyrene, and phenolic aldehyde resin, we prefer to employ one part by weight polystyrene, two parts by weight rubber hydrochloride or rubber chloride, and two parts by weight phenolic resin.

In the following examples, all parts are by weight:

*Example 1*

This specific example illustrates the most advantageous composition for use as a closure lining material. Sixty parts by weight of blown asphalt having a melting point between about 220° F. and about 230° F. are blended by applying heat with 15 parts by weight of polystyrene and 30 parts by weight of a condensation product of a terpene, phenol, and formaldehyde and with 20 parts by weight of rubber hydrochloride resin. This blended mixture is cooled, broken up, and then worked up with 100 parts of polyisobutylene on differential speed rolls. One hundred twenty-five parts by weight of calcium silicate, 75 parts by weight magnesium silicate, and 30 parts by weight of iron oxide are then added and the mixture thus formed is then heated at a temperature of 200–250° F. until a homogeneous mixture is obtained.

*Example 2*

This specific example illustrates a highly satisfactory composition for use as a closure lining material. Two hundred parts by weight of blown asphalt having a melting point between about 220° F. and about 230° F. are blended by applying heat with 30 parts by weight of polystyrene and 50 parts by weight of a condensation product of a terpene, phenol, and formaldehyde. The mixture is then worked upon differential speed rolls, and added to 200 parts by weight of polyisobutylene and heated and agitated until homogeneous. Two hundred parts by weight of wood flour are then added and the mixture thus formed is then heated at a temperature of 240° C. until a homogeneous mixture is obtained.

Other specific examples of liner compositions within the scope of our invention, which compositions are prepared in a manner similar to that set forth in Example 1 are as follows:

Example 3

| | Parts by weight |
|---|---|
| Polyisobutylene | 100 |
| Blown asphalt 220–230° F. M. P. | 100 |
| Polycoumarone | 40 |
| Limed rosin | 60 |
| Walnut shell flour | 200 |

Example 4

| | Parts by weight |
|---|---|
| Polyisobutylene | 200 |
| Blown asphalt of Example 2 | 200 |
| Zinc resinate | 25 |
| Rubber hydrochloride | 50 |
| Calcium silicate | 400 |

Example 5

| | Parts by weight |
|---|---|
| Polyisobutylene | 75 |
| Blown asphalt of Example 2 | 75 |
| Polystyrene | 10 |
| Rubber hydrochloride | 40 |
| Flax fiber | 125 |

The above examples are given by way of illustration and not by limitation and the ingredients and proportions set forth may be varied without departing from the scope of our discovery.

The composition of our invention, although it has been disclosed with particular reference to lining materials for container closures, may be employed for other purposes such as gasket material, and the like.

The composition of our invention is flexible, compressible, impermeable to gas and liquid and is free from tack. Such a composition having such ingredients as have been set forth above is particularly adapted as a lining material for use in closures for pressure foods and beverages. Liners of such composition have retained pressures up to about 150 pounds per square inch without failure of the liner itself or damage to the container contents.

The composition may be applied to closures by several different methods. The compositions may be calendered or duplexed at proper thicknesses to suitable backing material such as pulpboard, newsboard, and the like, which laminated materials are then applied to closures by punching or cutting discs from the sheet of laminated material. The composition may also be applied to a backing already positioned in a closure shell by punching out lining materials of the desired diameter from ribbons or strips of the composition. The composition is also capable of being applied directly to the closure shell without any backing material either as a disc or in washer form. Although the composition has been described as particularly adaptable for use as a liner for closures to be used with pressure foods and beverages, it may also be employed as a liner for screw-type closures, those which are employed as a sealing means for containers of non-pressure foods or beverages.

Although our invention has been described by certain specific embodiments and specific examples, the invention is not intended to be limited by the above description, but may be otherwise embodied and practiced within the scope of the appended claims.

We claim:

1. A composition of matter comprising about 20 to 30 parts by weight of polyisobutylene having an average molecular weight of 100,000 to 150,000; about 13 to 30 parts by weight of asphalt containing about 8 to 16 parts by weight of hardening agent for said polyisobutylene, said hardening agent comprising about one part by weight of polystyrene and about 2 parts by weight of a permanently fusible resinous condensation product of a terpene, a phenol, and acetone; and a filler.

2. A composition of matter comprising about 20 to 30 parts by weight of polyisobutylene having an average molecular weight of 100,000 to 150,000; about 13 to 30 parts by weight of asphalt containing about 8 to 16 parts by weight of a hardening agent for said polyisobutylene, said hardening agent comprising about one part by weight of polystyrene resin, about 2 parts by weight of a permanently fusible resinous condensation product of a terpene, a phenol, and acetone and about 2 parts by weight of rubber hydrochloride; and a filler.

3. A composition of matter comprising about 20 to 30 parts by weight of polyisobutylene having an average molecular weight of 100,000 to 150,000; about 13 to 30 parts by weight of blown asphalt having a melting point of about 220° F. to about 230° F. containing about 8 to 16 parts by weight of hardening agent for said polyisobutylene, said hardening agent comprising about one part by weight of polystyrene and about 2 parts by weight of a permanently fusible resinous condensation product of a terpene, a phenol, and acetone; and filler.

4. A composition of matter comprising about 20 to 30 parts by weight of polyisobutylene having an average molecular weight of 100,000 to 150,000, about 13 to 30 parts by weight of blown asphalt having a melting point of about 220° F. to about 230° F. containing about 8 to 16 parts by weight of a hardening agent for said polyisobutylene, said hardening agent comprising about one part by weight of polystyrene resin, about 2 parts by weight of a permanently fusible resinous condensation product of a terpene, a phenol, and acetone and about 2 parts by weight of rubber hydrochloride; and filler.

5. A composition of matter comprising about 20 to 30 parts by weight of polyisobutylene having an average molecular weight of 100,000 to 150,000; about 13 to 30 parts by weight of blown asphalt having a melting point of about 220° F. to about 230° F. containing about 8 to 16 parts by weight of hardening agent for said polyisobutylene, said hardening agent comprising about one part by weight of polystyrene and about 2 parts by weight of a permanently fusible resinous condensation product of a terpene, a phenol, and acetone; and from about 25 to about 55 parts by weight of filler.

6. A composition of matter comprising about 20 to 30 parts by weight of polyisobutylene having an average molecular weight of 100,000 to 150,000, about 13 to 30 parts by weight of blown asphalt having a melting point of about 220° F. to about 230° F. containing about 8 to 16 parts by weight of a hardening agent for said polyisobutylene, said hardening agent comprising about one part by weight of polystyrene resin, about 2 parts by weight of a permanently fusible resinous condensation product of a terpene, a phenol, and acetone and about 2 parts by weight of a rubber hydrochloride; and from about 25 to about 55 parts by weight of filler.

ROBERT W. MERLEY.
VICTOR A. NAVIKAS.

No references cited.